United States Patent Office 3,541,704
Patented Nov. 24, 1970

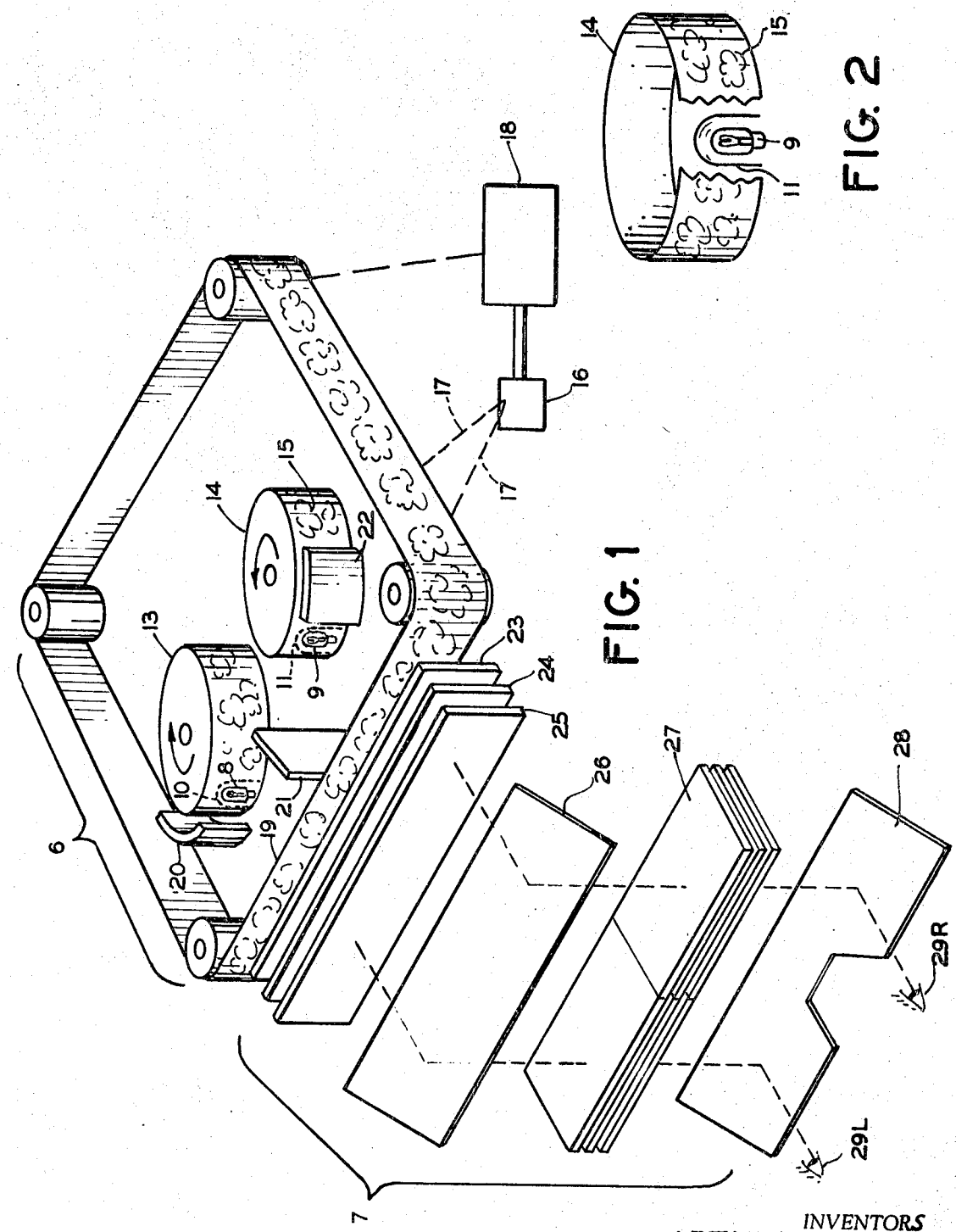

3,541,704
VISUAL SIMULATOR FOR DYNAMIC FOG AND CLOUD MOTION EFFECTS
Arthur Simon, Fairlawn, Stanley S. Janoski, Parsippany, and Warren G. Gundling, Bergenfield, N.J., assignors to The Bendix Corporation, a corporation of Delaware
Filed June 20, 1968, Ser. No. 738,641
Int. Cl. G09b 9/08
U.S. Cl. 35—12         7 Claims

ABSTRACT OF THE DISCLOSURE

A fog simulator for producing a realistic fog structure which, to the pilot, appears at a distance and is registered to the terrain in his line of sight. It provides a changing pattern of fog structure as the aircraft descends or ascends through the simulated fog and also provides an effect that creates the illusion of "streaming" of the simulated fog or clouds as the aircraft passes through it.

CROSS-REFERENCE TO RELATED APPLICATIONS

The present invention is related to the concepts found in a Fog Simulator and method for Accomplishing Airborne Simulation of a Fog such as disclosed and claimed in copending U.S. application Ser. No. 604,476 filed Dec. 23, 1966, by Paul A. Noxon, now U.S. Pat. No. 3,427,730, granted Feb. 18, 1969, and assigned to the Bendix Corporation.

BACKGROUND OF THE INVENTION

Field of the invention

The present invention relates to means for simulating atmospheric conditions and, more particularly, to the simullation of fog, as a visual display, as viewed from an aircraft to facilitate the training and testing of aircraft operators by varying fog density so as to approximate visual effects under true fog conditions.

Description of the prior art

A description of the prior art, and the attendant problems to which the present invention is directed are set forth in the aforenoted U.S. Pat. No. 3,427,730. Further in the prior art, although the fog pattern was changing there was no illusion of "streaming" as the aircraft passes through the simulated fog as clouds. The present invention provides an improved lighting arrangement that gives the illusion of "streaming" as the aircraft passes through the simulated fog or clouds.

SUMMARY OF THE INVENTION

The present invention is directed to an improved lighting arrangement for a fog simulator in which light passing through textured cylinders rotated at a speed proportional to the aircraft forward velocity is directed upon the film having the fog patterns thereon to create the illusion of "streaming" of the simulated fog as the aircraft moves through it.

BRIEF DESCRIPTION OF THE DRAWINGS

FIG. 1 is a diagrammatical representation of a light system for a fog simulator embodying the invention.

FIG. 2 is partial section view of a cylinder used in FIG. 1.

DESCRIPTION OF THE PREFERRED EMBODIMENT

Referring now to the drawing, only that portion of a fog simulator which pertains to the invention is illustrated and described. It is understood that it could be incorporated in a complete system such as described and illustrated in the aforenoted U.S. Pat. No. 3,427,730 as well as in other similar systems. A fog simulator is indicated generally by the numeral 5 and can be considered as comprising two sections, a display section 6 and an optical section 7.

The display section 6 includes two light sources 8 and 9. Reflectors 10 and 11 may be provided for the respective light sources 8 and 9. Each of the light sources are covered by respective transparent cylinders 13 and 14, such for example as transparent glass. The cylinders 13 and 14 have a textured or patterned surface 15, see FIG. 2. The cylinders 13 and 14 are adapted for rotation by motor 16 through shafts and gearing indicated schematically by the dashed lines 17. The cylinder 13 is rotated in a clockwise direction and the cylinder 14 is rotated in counterclockwise direction. The motor 16 is controlled in accordance with the speed of the aircraft from a control network indicated generally by the numeral 18. A transparent continuous variable light transmission strip or film 19 is positioned to pass in front of the light sources 8 and 9 and may also be controlled by the control network 18. Suitable masking 20, 21 and 22 are provided for the cylinders 13 and 14 to reduce stray reflections. The strip or film 19 is positioned to be in the focal plane of the optical system 7.

The optical system 7 includes a diffuser 23 located adjacent to and parallel with the film 19. A color correcting filter 24 is positioned between the diffuser 23 and a field flattener 25. The images passing through the members 23, 24 and 25 is transmitted to a front surface mirror 26 which is angularly oriented so as to be reflected in a direction perpendicular to a collimating lens system 27. The images pass through the collimating lens system 27 and are intercepted by partial mirror 28 from which they are transmitted to observer 29.

It is understood that the system would be enclosed in a suitable housing which has been omitted in order to show the details of the system. Also it is understood that it would be used in a system such as described and claimed in the aforenoted U.S. Pat. No. 3,427,730 in which there is provided a partial reflecting or combining mirror corresponding to the partial mirror 28 of the present invention and through which light rays from a visual scene of a region viewable by an observer in the aircraft may be directed to the eyes 29R and 29L of the observer during flight of the aircraft. In the improvement of the present invention in such a system variable output visual fog pattern light rays provided by the display section 6 cause simulated visual fog patterns or simulated visual cloud formations to be transmitted through the optical section 7 to the partial reflecting mirror 28. The partial reflecting mirror 28 is so operatively arranged as to combine the variable output visual fog pattern light rays provided by the display section 6 with the light rays from the true world scene viewable through the partial mirror 28 and transmit to the eyes 29R and 29L of the observer a combination of the aforesaid two sets of light rays.

In the operation, the motion of the cylinders 13 and 14 rotating about their axis in diverging senses relative to an effective portion of the film 19 serve to cast moving shadows on the film 19, the effective portion of which is located at the focal plane of the optical system. These shadows are the results of the light passing through the textured surface 15 of the cylinders 13 and 14 which provide variable output fog pattern light rays causing simulated visual fog patterns or cloud formations. The left eye 29L of the observer would see apparent motion of light moving on a viewable surface of the partial mirror 28 from center or diverging to the left from intermediate opposite ends of the partial mirror 28. The right eye 29R of the observer would see apparent motion of light moving on the viewable surface of the partial mirror 28 from the center or diverging to the right from intermediate opposite ends of the partial mirror 28. The resultant effect would be an apparent movement of the variable fog pattern light rays in diverging senses from intermediate the opposite ends of the viewable surface of the partial mirror 28 toward the opposite ends of the partial mirror 28 to provide a visual illusion of "streaming" of the simulated fog or clouds as the aircraft passes through it. Thus the observer is provided with a visual simulation of passage of the aircraft through the simulated fog or clouds at a speed related to the speed of flight of the aircraft.

Although only one embodiment of the invention has been illustrated and described, various changes in the form and relative arrangement of the parts, which will now appear to those skilled in the art, may be made without departing from the scope of the invention.

What is claimed is:

1. In an aircraft, a fog simulating system of a type including a display section for providing variable output fog pattern light rays to effect a simulated visual fog pattern during flight of the aircraft, light rays combining means through which second light rays from a visual scene of a region may be viewable by an observer in the aircraft during flight of the aircraft over said region, an optical section for transmission of the first light rays to the combining means, and the combining means being operatively arranged so as to combine the simulated visual fog pattern effected by the first light rays with the second light rays from the visual scene and transmit a combined view thereof to the observer in the aircraft; an improvement comprising the display section including a pair of light sources, a pair of transparent cylinders positioned over said light sources, said cylinders having a textured surface, means for rotating said cylinders in proportion to the speed of flight of said aircraft, a transparent continuously variable light transmission strip, and means positioning said transparent continuously variable light transmission strip for lateral movement in front of said light sources, said rotating cylinders providing through said light transmission strip variable output fog pattern light rays related to the speed of flight of the aircraft, and the optical section including an optical system positioned parallel to said transparent continuously variable light transmission strip with said strip being in the focal plane of said optical system, the variable fog pattern light rays being applied through said optical system of the optical section to the combining means so that there may be transmitted to the observer in the aircraft a combined view of the simulated visual fog pattern and the visual scene of said region related to the speed of flight of the aircraft.

2. The combination as set forth in claim 1 in which said cylinders are rotated in opposite directions and in senses to provide a visual effect of an apparent movement of the variable fog pattern light rays transmitted to the observer from the combining means in diverging senses toward opposite ends of the combining means.

3. The combination as set forth in claim 2 in which the pair of cylinders includes a left hand cylinder and a right hand cylinder in operative relation in the display section, and the means for rotating said cylinders includes means for rotating each of the cylinders in diverging senses to provide the visual effect of the apparent movement of the variable fog pattern light rays.

4. The combination as set forth in claim 2 in which the textured surface of said cylinders cooperate with said light sources for providing variable output fog pattern light rays to effect the simulated visual fog pattern.

5. The combination as set forth in claim 4 in which the means for rotating the cylinders includes means for rotating each of the cylinders in diverging senses relative to an effective portion of said light transmission strips, and including shielding means positioned between the cylinders and the light transmission strip and adjacent said cylinders at opposite sides and intermediate the pair of cylinders to reduce stray reflections during rotation of the cylinders in said divering senses.

6. The combination as set forth in claim 5 in which said optical system includes collimating optics for transmission of said variable output fog pattern light rays in said diverging senses to said combining means.

7. The combination as set forth in claim 6 in which the combining means of said optical system includes a partial mirror for presenting the variable fog pattern light rays passed through said optical system on to the visual scene of the region viewed by the observer through the partial mirror to effect the apparent movement of the variable fog pattern light rays in diverging senses from intermediate opposite ends of a viewable surface of the partial mirror toward the opposite ends of the partial mirror to provide the observer with a visual simulation of passage of the aircraft through the simulated visual fog pattern and relative to the visual scene of the region viewed by the observer through the partial mirror at a speed related to the speed of the aircraft in flight over said region.

References Cited
UNITED STATES PATENTS

| 3,427,730 | 2/1969 | Noxon | 35—12 |
| 3,436,840 | 4/1969 | Noxon | 35—12 |

EUGENE R. CAPOZIO, Primary Examiner

P. V. WILLIAMS, Assistant Examiner

U.S. Cl. X.R.

353—13